(12) United States Patent
Emery et al.

(10) Patent No.: US 7,391,141 B2
(45) Date of Patent: Jun. 24, 2008

(54) ELECTRICAL-DISCHARGE-INHIBITING CONFORMABLE LAYER FOR USE IN INNER-COOLER COILS

(75) Inventors: Franklin T. Emery, Charlotte, NC (US); Douglas J. Conley, Charlotte, NC (US); James F. Lau, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 402 days.

(21) Appl. No.: 11/087,002

(22) Filed: Mar. 22, 2005

(65) Prior Publication Data

US 2006/0214530 A1    Sep. 28, 2006

(51) Int. Cl.
  *H02K 3/14* (2006.01)
(52) U.S. Cl. ........................ 310/213; 310/179
(58) Field of Classification Search ................ 310/213, 310/179, 208, 64
  See application file for complete search history.

(56) References Cited

U.S. PATENT DOCUMENTS

| | | | | |
|---|---|---|---|---|
| 4,403,163 | A | * | 9/1983 | Armerding et al. .......... 310/213 |
| 5,066,881 | A | * | 11/1991 | Elton et al. ................. 310/213 |
| 5,175,396 | A | * | 12/1992 | Emery et al. ................. 174/36 |
| 5,760,516 | A | * | 6/1998 | Baumann et al. ............. 310/201 |
| 6,043,582 | A | * | 3/2000 | Markovitz et al. .......... 310/213 |
| 6,420,812 | B1 | * | 7/2002 | Emery ........................ 310/196 |
| 6,498,415 | B1 | * | 12/2002 | Emery ........................ 310/196 |
| 6,624,547 | B1 | | 9/2003 | Emery |

* cited by examiner

*Primary Examiner*—Nguyen N Hanh

(57) ABSTRACT

A conformable layer (14) for inhibiting electrical discharge between vent tubes (16) and strands (12) in an inner-cooled coil (5). The conformable layer comprises a resistive inner core (24) and a conductive strip (20) wrapped in a conductive outer wrap (26). The conductive strip (20) is electrically connected to the strands (12) at one end of the coil (5) and left to electrically float at the other end. In this configuration, the conformable layer (14) reduces voltage buildup between the vent tubes (16) and the strands (12) to help prevent electrical damage to the coil (5).

13 Claims, 2 Drawing Sheets

ELECTRICAL-DISCHARGE-INHIBITING CONFORMABLE LAYER FOR USE IN INNER-COOLER COILS

CROSS-REFERENCE TO RELATED APPLICATIONS

Not applicable.

FEDERALLY SPONSORED RESEARCH OR DEVELOPMENT

Not applicable.

SEQUENCE OR COMPUTER PROGRAM LISTING

Not applicable.

BACKGROUND OF THE INVENTION

The present invention relates to high-voltage stator coils and more particularly to methods and apparatuses for inhibiting electrical discharge between vent tubes and strands in inner-cooled stator coils. Although the following discussion focuses on stator coils for turbogenerators, the present invention is applicable to other dynamoelectric machines, including electric motors.

Conventional turbogenerators have a rotor and a stator. The rotor is wound with field windings, which are disposed in slots in the body of the rotor. The stator is wound with stator coils, which are disposed in slots in the body of the stator. When the rotor is rotated by an external source of mechanical energy, such as a steam turbine or a gas turbine, and an excitation current is provided to the field windings, electrical energy is induced in the stator coils.

Stator coils are generally constructed from a plurality of individual conductors referred to as strands. The strands are stacked together to form a larger conductor (or coil) capable of carrying high voltages and currents. In many stator coils, the strands are twisted into a weaved pattern rather than simply being stacked one on top of another. This weaving technique is known as Roebelling. elling helps prevent the inner strands of a stator coil, which are closest to the rotor, from carrying more current (and generating more heat) than the outer strands, which are further from the rotor. elling helps ensure that each strand carries a similar amount of current and generates a similar amount of heat.

Some stator coils include integral vent tubes to help cool the strands. These types of stator coils are referred to as inner-cooled coils. In inner-cooled coils, a plurality of vent tubes are generally stacked on top of one another and sandwiched between two or more stacks of strands. A cooling gas like hydrogen or air is then pumped through the vent tubes to help transfer heat away from the strands.

There are a number of challenges associated with manufacturing inner-cooled stator coils. For example, after a stack of strands has been elled, the top and bottom surface of the stack is no longer smooth. The surfaces have significant irregularities or indentations caused by the elling of the strands. These irregularities make it difficult to apply the outer layer of insulation, referred to as ground-wall insulation.

Another challenge involves the fact that an extremely large voltage differential can appear between the strands and the vent tubes in a stator coil while a generator is operating. If this voltage differential exceeds the dielectric strength of the insulation between the strands and the vent tubes, an electrical short will occur between the copper strands and the vent tubes, which can lead to circulating currents in the vent tubes and catastrophic damage to the stator coil.

In an effort to inhibit electrical shorts between stands and vent tubes, U.S. Pat. No. 6,624,547 to Emery, which is incorporated by reference herein in its entirety, discloses reducing the potential difference between copper strands and vent tubes by introducing a compact voltage grading means between the copper strands and the vent tubes. This grading means is formed from conductive strips that are positioned between a stack of strands and a stack of vent tubes. The conductive strips are fixed in place with multiple layers of insulating tape and provide electrical grading between the strands and vent tubes. Despite the significant advancement provided by this approach, there remains a continued need for improvements in stator coil configurations than provide increased protection against electrical shorts, while also reducing the complexity and costs associated with manufacturing stator coils.

SUMMARY OF THE INVENTION

With the foregoing in mind, methods and systems consistent with the present invention provide a conformable layer that inhibits electrical shorts between vent tubes and strands in an inner-cooled coil. The conformable layer conforms to the irregular surface of a stack of vent tubes and strands in order to facilitate the application of groundwall insulation over the stator coil. The conformable layer includes a conductive strip for electrically connecting the conformable layer to a corresponding stack of strands in order to reduce the potential difference between the strands and the vent tubes and thereby inhibiting electrical shorts there between.

BRIEF DESCRIPTION OF THE DRAWINGS

The invention is explained in more detail by way of example with reference to the following drawings.

DETAILED DESCRIPTION

Figure 1:
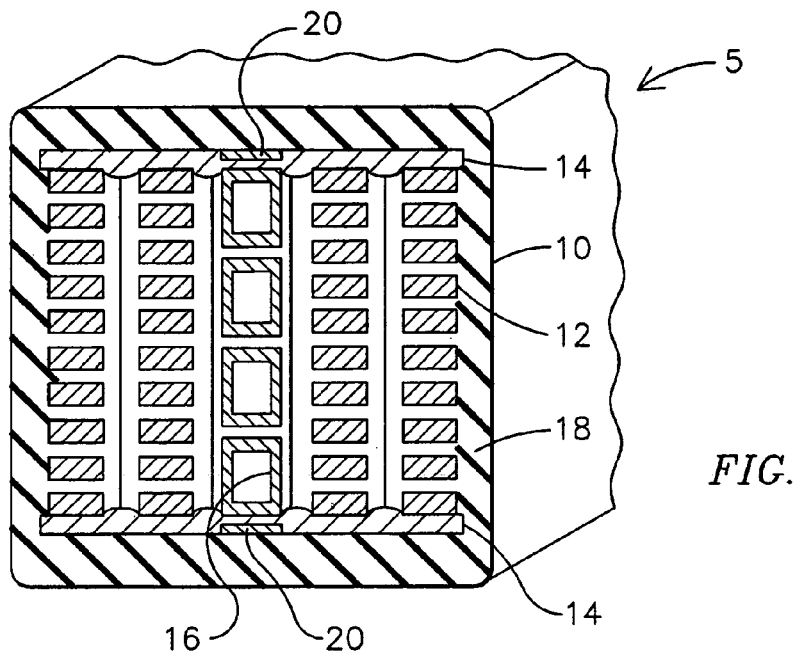
FIG. 1 illustrates a stator coil consistent with an exemplary embodiment of the present invention.

Methods and systems consistent with the present invention provide an electrical-discharge-inhibiting conformable (EDIC) layer for use in inner-cooled coils. Although the invention is described below in connection with a generator stator coil, methods and systems consistent with the invention are suitable for use with other dynamoelectric machines, including motors. The invention may also be embodied in many different forms and should not be construed as limited to the embodiments set forth herein. Rather, these embodiments are provided so that this disclosure will be thorough and complete, and will fully convey the scope of the invention to those skilled in the art. The scope of the invention should be determined based upon the appended claims and their legal equivalents.

FIG. 1 illustrates a stator coil 5 consistent with an exemplary embodiment of the present invention. A complete generator stator coil is generally manufactured from a number of individual stator coil sections. These sections include a straight portion and an involute portion (not shown). The straight portion is approximately the same length as the stator slot for which it is intended. The involute portions are located at each end of the straight portion and facilitate the interconnection of multiple stator coil sections into a complete generator stator coil.

The stator coil 5 illustrated in FIG. 1 is an inner-cooled stator coil. It includes a stack of vent tubes 16 and a stack of strands 12. The vent tubes 16 are preferable substantially rectangular and tubular and constructed of a conductive material such as copper. Multiple vent tubes may be stacked on top of one another for increased cooling capacity. Each of the vent tubes 16 preferably includes a layer of insulation over its outer surface (not shown). The stator coil 5 illustrated in FIG. 1 also includes four stacks of strands 12. The strands 12 are preferably substantially rectangular and solid and constructed of a conductive material such as copper. The strands 12 may be weaved into a el pattern for increased efficiency. Each of the stands 12 preferably includes a layer of insulation over its outer surface (not shown).

An EDIC layer 14 is installed on the upper and/or lower surface of the stack of strands 12 and vent tubes 16. The EDIC layer 14 conforms to irregularities in these surfaces to facilitate the application of groundwall insulation 18. An outer electrode 10 is applied over the groundwall insulation 18. The length of the EDIC layer 14 is preferably substantially equal to that portion of the stator coil 5 that includes an outer electrode 10. The width of the EDIC layer 14 is preferably substantially equal to the width of the corresponding stack of strands 12 and vent tubes 16. The thickness of the EDIC layer 14 is preferably substantially equal to the depth of the irregularities in the surface of the elled strands.

Figure 2:
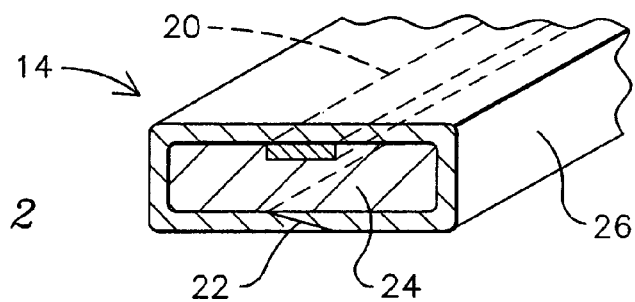
FIG. 2 illustrates an electrical-discharge-inhibiting conformable layer consistent with an exemplary embodiment of the present invention.

FIG. 2 illustrates an EDIC layer 14 consistent with an exemplary embodiment of the present invention. When referring to the surfaces of the EDIC layer, the surface closest to the strands 12 and vent tubes 16 will be referred to as the inner surface. The opposite surface will be referred to as the outer surface. The EDIC layer 14 includes an inner core 24, a conductive strip 20, and an outer conductive wrap 26. The inner core 24 comprises a substantially resistive material, such as aramid reinforcement fiber impregnated with 25-60% B-staged epoxy resin binder. One example of a suitable reinforcement fiber is Nomex™ spun felt, available from E.I. Du Pont de Nemours & Co., Inc. One example of a suitable binder is novolak thermoplastic B-staged phenolic resin. The conductive strip 20 of the EDIC layer 14 is positioned adjacent to the inner core 24. The conductive strip 20 may be constructed of any conductive material, such as metal, but is preferably constructed of copper. The conductive strip also preferably has a surface resistance of less than 1 ohm/square. The EDIC layer also includes a conductive outer wrap 26. The conductive outer wrap 26 is wrapped around the inner core 24 and conductive strip 20. In the preferred embodiment, the wrap 26 is formed from a single sheet of conductive fleece, such as carbon loaded glass or polyester fleece. The conductive outer wrap 26 preferably has a width slightly larger than the perimeter of the inner core 24 so that it may be wrapped around the inner core 24 and conductive strip 20 and form a small lap joint 22.

It will be understood by those skilled in the art that EDIC layers consistent with the present invention may be produced using various manufacturing methods. One example of a method suitable for forming the EDIC layer 14 comprises the steps of (a) taking a layer of aromatic polyamide (or aramid) reinforcement felt, (b) positioning a conductive strip adjacent to the felt, (c) wrapping the felt and strip with a conductive outer wrap, (d) impregnating the assembly with an epoxy resin, (e) draining the excess resin, and (f) pressing and baking the assembly in a heated press to cure it to a B-stage. While the assembly preferably starts out with a thickness of approximately 130 mils, after it is pressed and baked it will be compressed by approximately 20-80%. In addition, while the starting surface resistivity of the assembly may be as low as 50-100 ohms/square, after pressing the assembly should preferably have a surface resistivity of 2000-5000 ohms/square.

The resulting EDIC layer may be installed on either the top or bottom surface of a stack of strands and vent tubes but is preferably installed on both the top and bottom surface. During installation, one end of the conductive strip is electrically connected to the strands via welding, brazing, or soldering and the other end is left to electrically float. Approximately ¼ square inch of the strand's surface may be stripped of insulation to facilitate the electrical connection. In a preferred embodiment, the conductive strip is positioned on the outer surface of the EDIC layer to make it easier to access during installation.

Figure 3:
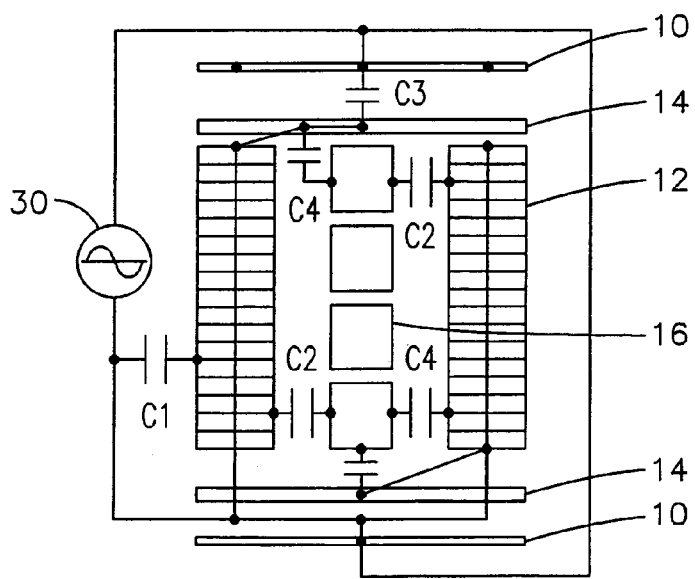
FIG. 3 illustrates a schematic diagram of the stator coil of FIG. 1.
Figure 4:
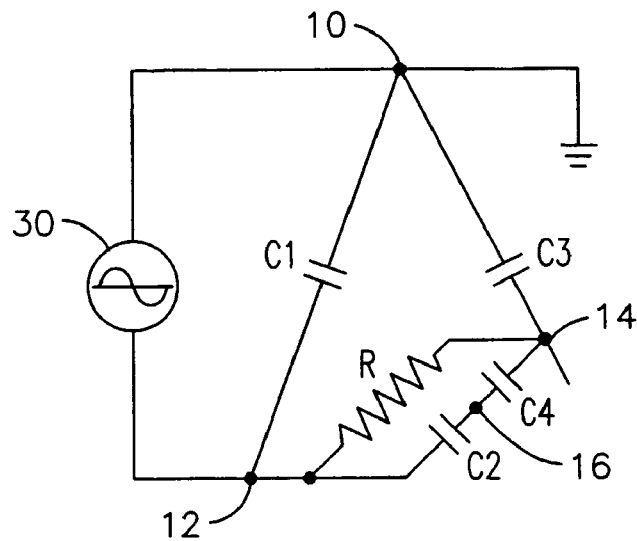
FIG. 4 illustrates a second schematic diagram of the stator coil of FIG. 1.

FIG. 3 and 4 are electrical schematics illustrating the electrical properties of a stator coil consistent with the present invention. Capacitance C1 represents the capacitance between the strands 12 and the outer ground electrode 10. Capacitance C2 represents the capacitance between the strands 12 and the vent tubes 16. Capacitance C3 represents the capacitance between the outer ground electrode 10 and the EDIC layer 14. Due to the addition of the EDIC layer 14, an additional capacitance C4 is present between the EDIC layer 14 and the vent tubes 16. Voltage 30 represents the applied voltage across the strands 12 and outer ground electrode 10. The resistance of the EDIC layer 14 is represented by resistance R, which acts to reduce voltage buildup across the strands 12 and vent tubes 16. The additional capacitive reactance of C4 also helps to reduce voltage buildup between the strands 12 and vent tubes 16. The value of resistance R is preferably selected to optimally reduce the voltage across C2 and C4.

Figure 5:
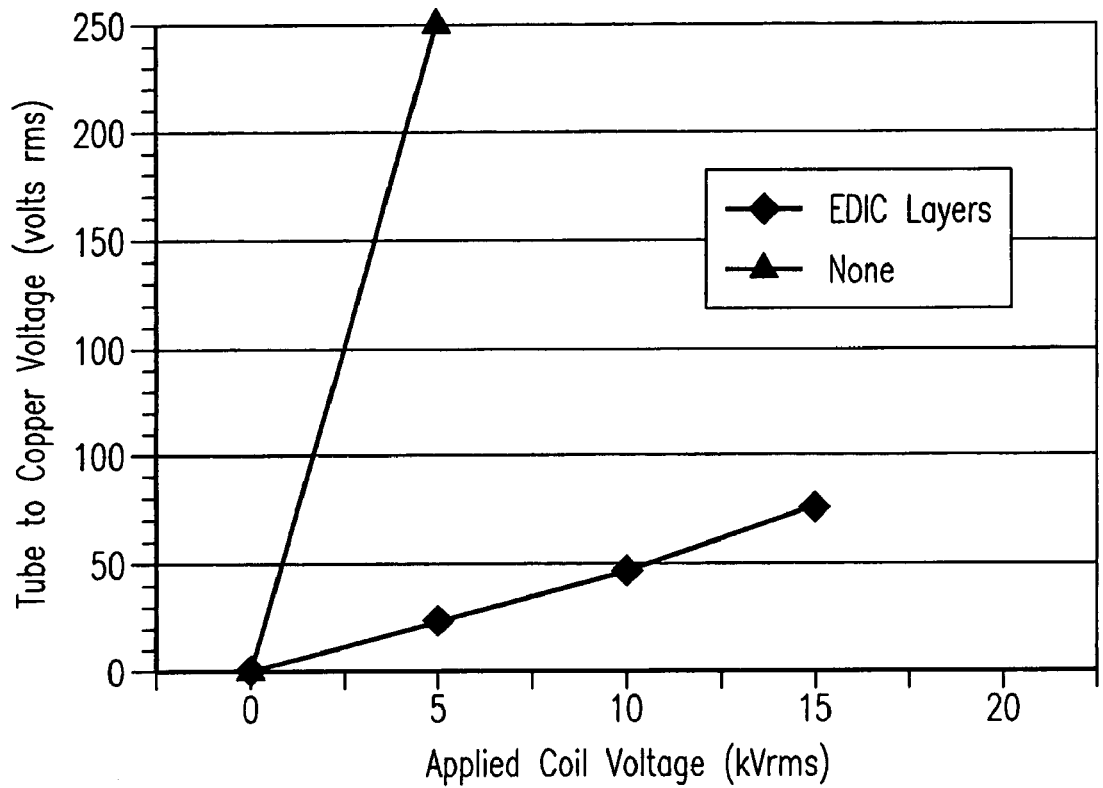
FIG. 5 illustrates tube-to-copper voltage in a stator coil with and without electrical-discharge-inhibiting conformable layers.

FIG. 5 is a graph illustrating exemplary results from electrical tests performed on stator coils with and without EDIC layers. The graph represents the voltage (labeled Tube-to-Copper Voltage) between the outer vent tube (i.e., the top or bottom vent tube in a stack of vent tubes) and the strands in a test coil as a function of the voltage on the strands (labeled Applied Coil Voltage). Two tests are illustrated in FIG. 5. The first first test (identified by triangles) involved a coil with no EDIC layers installed. In this configuration, an Applied Coil Voltage of approximately 5 kilovolts (rms) resulted in a Tube-to-Copper Voltage of approximately 250 volts (rms). The second test (identified by diamonds) involved a coil with an EDIC layer installed on the top and bottom of the stack assembly of the coil. In this configuration, an Applied Coil Voltage of approximately 5 kilovolts resulted in a Tube-to-Copper Voltage of approximately 25 volts (rms). These results verify that Tube-to-Copper Voltage can be significantly reduced by including EDIC layers in a coil.

What is claimed is:

1. A dynamoelectric machine, comprising:

a rotor; and a stator positioned adjacent said rotor, said stator including a plurality of high-voltage stator coil sections, each of said stator coil sections comprising a plurality of strands elled to form a stack of strands, a plurality of vent tubes stacked to form a stack of vent tubes, wherein said stack of vent tubes is positioned adjacent to said plurality of strands to form a stack assembly, said stack assembly having a surface with irregularities, a layer of groundwall insulation formed around said stack assembly, an outer ground electrode formed around said groundwall insulation, and a conformable layer positioned on said surface of said stack assembly, between said stack assembly and said groundwall insulation, wherein said conformable layer conforms substantially to said irregularities and wherein said conformable layer comprises an inner core and a conductive strip for electrically connecting said conformable layer to said stack of strands, wherein said inner core and said conductive strip are surrounded by an outer conductive layer.

2. A dynamoelectric machine, comprising:

a rotor; and a stator positioned adjacent said rotor, said stator including a plurality of high-voltage stator coil sections, each of said stator coil sections comprising a plurality of strands elled to form a stack of strands, a plurality of vent tubes stacked to form a stack of vent tubes, wherein said stack of vent tubes is positioned adjacent to said plurality of strands to form a stack assembly, said stack assembly having a surface with irregularities, a layer of groundwall insulation formed around said stack assembly, an outer ground electrode formed around said groundwall insulation, and a conformable layer positioned on said surface of said stack assembly, between said stack assembly and said groundwall insulation, wherein said conformable layer conforms substantially to said irregularities and wherein said conformable layer further comprises an inner core and a conductive strip for electrically connecting said conformable layer to said stack of strands, and wherein said conformable layer and conductive strip are surrounded by an outer conductive layer, wherein said conformable layer further comprises an inner core and conductive strip surrounded by an outer conductive layer and wherein one end of said conductive strip is electrically connected to said plurality of strands and the other end of said conductive strip is permitted to electrically float.

3. The dynamo electric machine of claim 1, wherein said inner core is a composite formed from an aramid fiber reinforcement impregnated with an epoxy resin binder.

4. The dynamoelectric machine of claim 3, wherein said aramid fiber reinforcement comprises NOMEX spun felt.

5. The dynamoelectric machine of claim 4, wherein said epoxy resin binder comprises novolak thermoplastic B-staged phenolic resin.

6. The dynamoelectric machine of claim 5, wherein said outer conductive layer comprises a sheet of conductive fleece.

7. The dynamo electric machine of claim 6, wherein said conductive strip is electrically connected to said stack of strands by soldering.

8. A high-voltage coil for use in a dynamoelectric machine, comprising:

a plurality of strands elled to form a stack of strands, a plurality of vent tubes stacked to form a stack of vent tubes, wherein said stack of vent tubes is positioned adjacent to said stack of strands to form a stack assembly, said stack assembly having a surface with irregularities, a layer of groundwall insulation formed around said stack assembly, an outer electrode formed around said groundwall insulation, and a conformable layer positioned on said surface of said stack assembly, between said stack assembly and said groundwall insulation, wherein said conformable layer conforms substantially to said irregularities and wherein said conformable layer includes a conductive strip for electrically connecting said conformable layer to said stack of strands, wherein said conformable layer further comprises an inner core and an outer conductive layer and wherein said conductive strip is positioned between said inner core and said outer conductive layer.

9. The high-voltage coil of claim 8, wherein said inner core comprises a composite formed from an aramid fiber reinforcement impregnated with an epoxy resin binder.

10. The high-voltage coil of claim 9, wherein said aramid fiber reinforcement comprises NOMEX spun felt.

11. The high-voltage coil of claim 10, wherein said epoxy resin binder comprises novolak thermoplastic B-staged phenolic resin.

12. The high-voltage coil of claim 11, wherein said outer conductive layer comprises a sheet of conductive fleece.

13. The high-voltage coil of claim 12, wherein said conductive strip is electrically connected to said stack of strands by technique selected from the group consisting of soldering, brazing, and welding.

* * * * *